Figure 1:
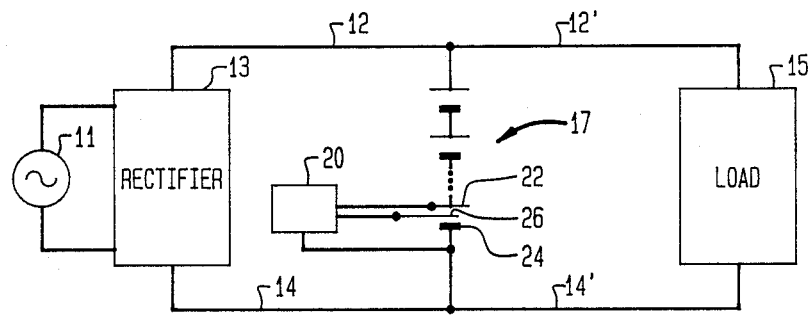

United States Patent [19]
Mistry et al.

[11] Patent Number: 4,935,688
[45] Date of Patent: Jun. 19, 1990

[54] ELECTRICAL STORAGE CELL LIFE EXTENDER

[75] Inventors: Keku M. Mistry, Somerset; Thomas D. O'Sullivan, Summit, both of N.J.

[73] Assignee: Bell Communications Research, Inc., Livingston, N.J.

[21] Appl. No.: 322,730

[22] Filed: Mar. 13, 1989

[51] Int. Cl.⁵ .............................................. H02J 7/00
[52] U.S. Cl. ........................................... 320/4; 320/39
[58] Field of Search ..................... 320/2, 3, 4, 5, 18, 320/15, 16, 17, 21, 37, 38, 39

[56] References Cited

U.S. PATENT DOCUMENTS

| | | | |
|---|---|---|---|
| 2,355,351 | 8/1944 | Willing | 320/4 X |
| 3,911,349 | 10/1975 | Seeley et al. | 320/39 X |
| 4,039,920 | 8/1977 | Popp | 320/39 X |
| 4,282,474 | 8/1981 | Wyzenbeek | 320/4 X |
| 4,358,895 | 11/1982 | Turillon et al. | 29/623.5 |
| 4,614,905 | 9/1986 | Petersson et al. | 320/18 |
| 4,621,225 | 11/1986 | Birk | 320/40 X |
| 4,728,877 | 3/1988 | Adamson | 320/4 X |
| 4,740,739 | 4/1988 | Quammen et al. | 320/21 X |

*Primary Examiner*—Steven L. Stephan
*Assistant Examiner*—Kristine L. Peckman
*Attorney, Agent, or Firm*—James W. Falk; Lionel N. White

[57] ABSTRACT

The useful life of an electrolytic battery cell commonly employed in a series string as a backup power source is significantly extended by maintaining the polarization of the positive plates of such a cell at a predetermined level relative to a reference electrode of similar composition in contact with the cell electrolyte. While the cell is being supplied with the usual float charging voltage, a controller circuit senses any variance of polarization below the desired level and meters a minute input current to the positive plates with a resulting increase in the polarization over a substantial time period. The slow biasing of the polarization effects a passivation of the surface of the plates which deters the penetration of oxygen to the plate metal and prevents the deep destructive formation of expansive metal oxide.

8 Claims, 1 Drawing Sheet

ELECTRICAL STORAGE CELL LIFE EXTENDER

BACKGROUND OF THE INVENTION

In order to maintain continuity of operation during periods of primary power source failure, many electrical systems, such as the public telephone network, utilize electrolytic batteries as interim sources of operating power. Depending upon the support voltage required, a number of battery cells are arranged in a series-connected string and the string is placed in the system circuit in parallel with the primary rectifier power source. During normal operation of the system, the rectifier source supplies operating power to the system and provides a continual "float" voltage to the cells to maintain the charge that will be needed to support the system in the event of failure of the primary power source.

The common lead-acid battery cell ($PbO_2/Pb/H_2SO_4$) widely used in support power supplies has a useful life of a number of years; however, this term is limited by the corrosion occurring, particularly at the positive cell electrode, due to the oxidizing conditions resulting from the repeated application of charging current to the cell. While this effect is exaggerated during periods of recharging after substantial support usage, even the low-level float voltage contributes to significant oxidation of the metallic lead grid at the positive electrode with resulting buildup of oxides that will ultimately cause physical damage to the cell.

Attempts have been made previously to minimize the deleterious effects of charging current on battery cells, but none have resolved the problem of damaging oxide generation. For example, in U.S. Pat. No. 4,614,905 a shunting circuit is used to divert charging current from the more fully-charged cells of a series string to prevent direct damage from overcharging, but even this extensive control does not affect the float or trickle charge to cells exhibiting a nominal full charge, and the oxidation of the positive electrode persists. Mechanical approaches, such as suggested in U.S. Pat. No. 4,358,892, have also been proposed, but have resulted in significant cost increases while only temporarily delaying the deep oxidation of the positive electrode occurring upon the application of recharging currents and under continuing oxidizing conditions resulting from persistent float voltage.

SUMMARY OF THE INVENTION

In the present invention, oxidization and corrosion of the plates of electrolytic battery cells, for example the positive electrode plates of lead-acid storage cells, is effectively minimized during float charge by the application of a minute additional current to the positive cell electrode to bias the polarization potential of those plates in the electrolyte toward a predetermined level. The invention also provides a means for monitoring the polarization potential and metering the appropriate current input to the positive electrode to obtain the desired polarization level.

We have found that the optimum positive plate potential for a lead-acid ($PbO_2/Pb/H_2SO_4$) battery cell under the usual float charge voltage of about 2.17 V is in the range of $60\pm20$ millivolts, depending upon electrolyte specific gravity and purity of electrode materials. In our procedure, this potential is monitored relative to a reference electrode having the positive electrode composition, i.e. $PbO_2/PbSO_4$, which is immersed in the cell electrolyte. The monitoring is effected by means of a low-power, limited current potentiostat-type device which responds to the polarization level by metering to the positive electrode a current of up to about 50 milliamps per kiloamp hour of cell rating depending upon the extent to which the polarization is below the desired optimum.

Under the influence of the adjusting current input, the polarization of the cell plates stabilizes within the desired 40-80 millivolt range over the period of a few months and remains at this steady state with little grid metal oxidation. Depending upon the frequency of duty cycling of the cell, and the resulting disruptive imposition of relatively massive recharging currents, the cell may remain in its passivated state for a number of years during which the polarization controller will occasionally introduce the minute adjusting current in order to account for slight polarization variations resulting from changes in cell chemistry and the like.

THE DRAWING

Figure 2:
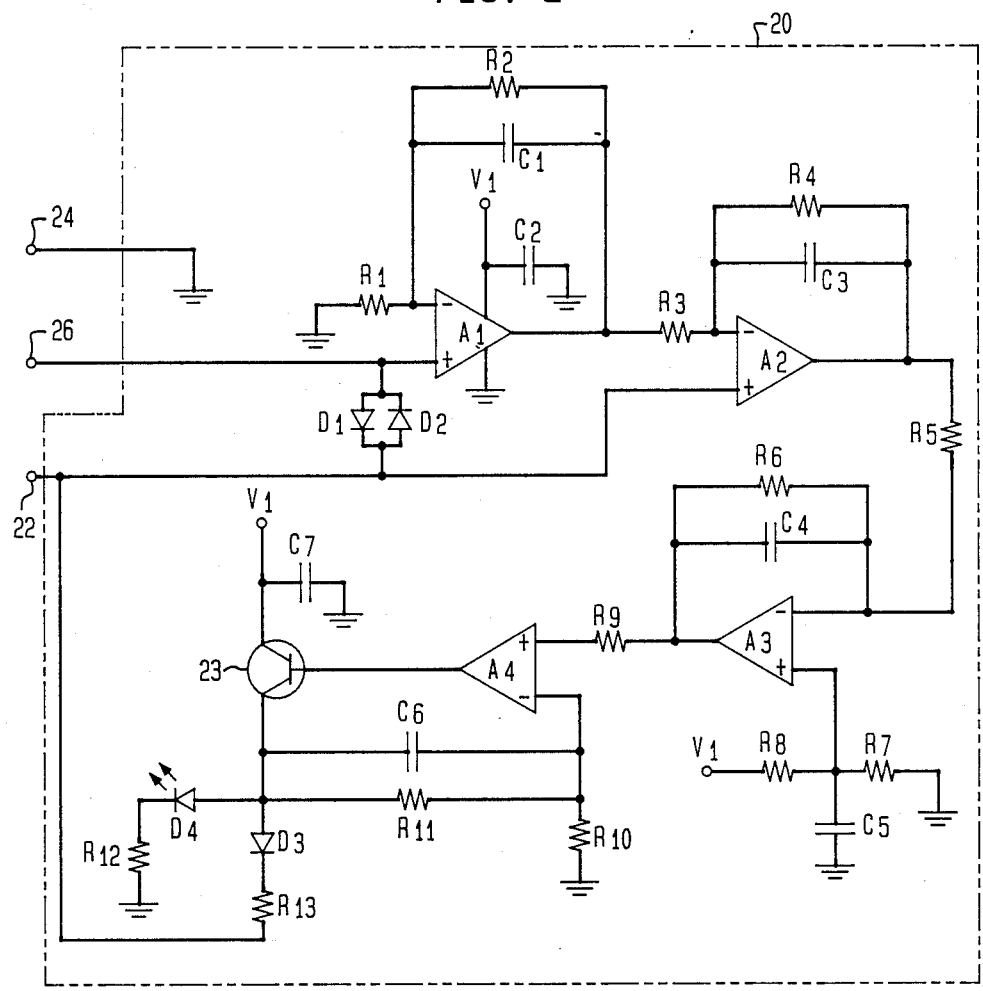

The present invention may be readily seen by reference to the accompanying drawing of which:

FIG. 1 is a representation of a typical electrical storage cell string circuit incorporating a polarization controller system according to the present invention; and FIG. 2 is a schematic diagram of a preferred embodiment of the polarization controller of the invention.

DESCRIPTION OF THE INVENTION

A common arrangement for providing continuous direct current power to a load 15, such as a telephone system, is generally shown in FIG. 1. A source 11 of alternating current provides the input to a rectifier 13 from which the direct current is furnished to load 15 by means of the circuit comprising conductors 12, 12', 14', 14. Connected between the conductors in parallel with load 15 is a series string 17 of a number of electrolytic storage cells which will ensure the continuity of operating power to the load via conductors 12', 14' in the event of failure of the rectifier power system.

In the typical telephone system, battery string 17 consists of twenty-four nominal 2 volt (2.06 VDC) lead-acid cells to yield a reserve power source of about 47 volts. To maintain the desired charge on the cells of string 17, rectifier 13 provides an optimum of about 52 volts which represents a "float", or trickle charge, voltage of about 2.2 volts per cell. This float voltage supports the cell charge by preventing sulfating of the electrodes and promoting oxidation at the surface of the positive electrode. Over time, however, this oxidation not only maintains the desired $PbO_2$ composition of the positive electrode surface, but also leads to a deeper formation of destructive oxide at the metallic lead of the positive electrode grid.

We have found that this undesirable deep oxidation of the positive cell electrode is more prevalent as the polarization potential at this electrode surface, itself apparently influenced by the condition of the surface composition, the state of the electrolyte, temperature, and other factors, approaches the lower end of its range. From our observations, we believe that although surface oxidation of the positive electrode continues throughout the range of polarization, the oxide formations at higher levels are of smaller particle size and more closely associated so as to form an effective barrier against the penetration of oxygen to the structural metallic lead of the positive electrode grid. Note should be taken, of course, that excessive levels of polarization result in the generation of increasingly high quantities of oxygen. A preferred range of polarization at the positive cell electrode which provides advantageous results appears to be about 60±20 millivolts with respect to a reference electrode having a chemical composition substantially the same as that of the positive electrode.

We have discovered further that the polarization of the positive cell electrode may be adjusted to a higher level within the desirable range, thereby reducing the effect of float voltage in promoting deep plate oxidation, by applying a minute additional current of up to about 50 milliamps to this electrode. With increasing reduced over time to a point where none is further required when the optimum polarization level has been achieved. Thereafter, the drifting of the polarization toward undesired lower levels may be remedied by occasional application of adjusting current.

In order to maintain an optimum polarization potential at the positive electrode of a battery cell, we have devised a monitoring polarization controller system, shown generally in FIG. 1, which comprises a reference electrode 26 and a controller 20, a preferred embodiment of which is more specifically depicted in FIG. 2. In operation, this system continually monitors the polarization potential between reference electrode 26 and positive battery electrode 22, and meters an appropriate amount of current to the positive electrode to bias the polarization toward the desired level in the noted range of about 60 millivolts. An effective current input range, stated with reference to the kiloamp-hour rating of the involved battery cell, varies with the relative positive electrode polarization as shown in Table 1.

TABLE 1

| Polarization (volts) | Input Current (mA/kAH) |
|---|---|
| 0.060 or over | 0 |
| 0.050 | 5 |
| 0.040 | 10 |
| 0.030 | 20 |
| 0.020 | 30 |
| 0.010 | 40 |
| 0.000 | 50 |

Although, for simplicity, only one such arrangement is shown in FIG. 1, in normal implementation of the polarization controller system, each cell of a battery string 17 would have associated with it a reference electrode 26 and a polarization controller 20. The controller 20, in each instance, is connected in electrode 26 which is immersed in the cell electrolyte along with electrode 22 and the negative cell electrode 24. The reference electrode 26 has the same $PbO_2$ chemical composition as positive electrode 22, and may be of any convenient shape and size. We have found the rod-like element of a typical tubular battery electrode to be particularly useful, since it may be readily accommodated through the usual battery vent opening.

A preferred embodiment of a controller 20 according to the present invention is shown in schematic detail in FIG. 2. This embodiment utilizes common resistor and capacitor circuit elements selected to exhibit functional values shown in Tables 2 and 3, and includes amplifiers A1–A4, each of which may be one element of a low power quad operational amplifier such as in the LM324 device that is available from National Semiconductor Corporation.

TABLE 2

| Resistors - ohms | |
|---|---|
| R1 - 1.0k | R8 - 100k |
| R2 - 100k | R9 - 1.0k |
| R3 - 1.0k | R10 - 1.0k |
| R4 - 100k | R11 - 2.0k |
| R5 - 10k | R12 - 2.0k |
| R6 - 20k | R13 - 130 (0.5 W) |
| R7 - 10k | |

The circuit further includes general purpose rectifier diodes D1-D3 marketed by Motorola, Inc. as the 1N4004 2N2222A product also from Motorola. An optional light-emitting diode D4 may be utilized to visually monitor the operation of the controller.

TABLE 3

| Capacitors - microfarads | |
|---|---|
| C1 - 2.2 | C5 - 47 (5V) |
| C2 - 0.47 | C6 - 2.2 |
| C3 - 2.2 | C7 - 0.1 |
| C4 - 2.2 | |

In use according to the present invention, controller 20 monitors, by means of op-amps A1, A2, the difference in polarization at the positive cell electrode 22 and the reference electrode 26, and utilizing remaining op-amps A3, A4 controls transistor 23 to pass through from +10 VDC source, V1, the appropriate amount of current, as outlined in Table 1. Resistor R13 is selected so as to limit to about 250 milliamps the current flow through otherwise unprotected transistor 23. Even with this limitation, however, the polarization controller system will be effective with cells of up to about 5 kAH rating.

By means of the present invention, the $PbO_2$ formation at the positive electrode grid surface may be established and maintained in a fine particle state in a few months at normal float current with the result that the positive electrode is effectively passivated by its smooth surface condition to prevent the formation of disruptive oxides at the surface of the lead alloy grid metal. The polarization state of the various positive electrodes in the battery string may be monitored by means of the noted optional LED which is illuminated to varying intensity depending upon the level of passivating current input. Persistent illumination of the LED at a particular cell provides a useful diagnostic indication that some malfunction of the cell is preventing optimum charging.

Under normal operation, the reference electrode of a polarization controller system itself requires recharging at four to six month intervals in order to maintain the proper condition of its own $PbO_2$ surface. Such reconditioning may readily be effected by simply shorting this reference electrode to the positive cell electrode, or otherwise charging the electrode at about 50 mA/kAH, and allowing it to remain on open circuit for about 10 to 15 hours before beginning the control cycle once again. This periodic charging of the reference electrode may be accomplished manually, or simple additional circuitry, not shown here, may be included in the controller arrangement to effect such cycling automatically.

The present invention, described here with respect to its currently preferred embodiment, thus provides a method and apparatus for maintaining for extended periods of time the effective operating condition of electrolytic battery cells by preventing the destructive oxidation of the structural electrode metal. It is anticipated that other embodiments of the invention will be apparent from the foregoing description to those of ordinary skill in the art, and such embodiments are invention as set out in the appended claims.

What is claimed is:

1. A method of extending the useful life of an electrical storage cell, which method comprises biasing the polarization potential of the positive cell electrode, when compared to a reference electrode in contact with the electrolyte of said cell and having substantially the same chemical composition as that of said positive electrode, upwardly toward the range of about 40 to 80 millivolts.

2. The method according to claim 1 wherein said cell is a lead-acid battery cell in circuit with a source of float charge voltage, which method comprises applying to said positive electrode an additional current of up to about 50 milliamps per kiloamp-hour of battery rating in generally inverse proportion to polarization potentials below about 60 millivolts.

3. A method of extending the useful life of a lead-acid battery cell in circuit with a source of float charge voltage, which method comprises:
   (a) measuring the polarization of the positive electrode of said cell with respect to a reference electrode in contact with the electrolyte of said cell and having substantially the same surface composition as that of said positive electrode; and
   (b) applying to said positive electrode an additional current of up to about 50 milliamps per kiloamp-hour of battery rating in generally inverse proportion to polarizations below about 60 millivolts.

4. The method according to claim 3 wherein said float charge voltage is about 2.2 VDC and said additional current is applied to said positive electrode substantially in accordance with the following table:

| Polarization (volts) | Input Current (mA/kAH) |
|---|---|
| 0.060 or over | 0 |
| 0.050 | 5 |
| 0.040 | 10 |
| 0.030 | 20 |
| 0.020 | 30 |
| 0.010 | 40 |
| 0.000 | 50 |

5. Apparatus for extending the useful life of an electrical storage cell in circuit with a source of float charge voltage, which apparatus comprises:
   (a) a reference electrode for contacting the electrolyte of said cell and having substantially the same surface composition as that of the positive electrode of said cell; and
   (b) controller means for measuring the polarization of said positive electrode with respect to said reference electrode and biasing said polarization upwardly toward the range of about 40 to 80 millivolts.

6. Apparatus according to claim 5 wherein said cell is a lead-acid battery cell and said controller means comprises:
   (a) means for comparing the polarization potential of said positive electrode with that of said reference electrode; and
   (b) means responsive to the difference between said potentials for applying to said positive electrode an additional current of up to about 50 milliamps per kiloamp-hour of battery rating in generally inverse proportion to polarizations below about 60 millivolts.

7. Apparatus according to claim 6 wherein said means for applying additional current comprises:
   (a) a source of current separate from said float charge voltage source;
   (b) gating means for metering current from said separate source to said positive electrode; and
   (c) means responsive to the difference between said potentials for controlling said gating means.

8. Apparatus according to claim 7 wherein said float charge voltage is about 2.2 VDC and said gate controlling means is arranged to effect the application of current to said positive electrode substantially in accordance with the following table:

| Polarization (volts) | Input Current (mA/kAH) |
|---|---|
| 0.060 or over | 0 |
| 0.050 | 5 |
| 0.040 | 10 |
| 0.030 | 20 |
| 0.020 | 30 |
| 0.010 | 40 |
| 0.000 | 50 |

* * * * *

UNITED STATES PATENT AND TRADEMARK OFFICE
CERTIFICATE OF CORRECTION

PATENT NO. : 4,935,688

DATED : Jun. 19, 1990

INVENTOR(S) : Mistry et al.

It is certified that error appears in the above-identified patent and that said Letters Patent is hereby corrected as shown below:

Column 3, lines 14 and 15 "With increasing reduced " -- should read "With increasing polarization this adjusting current may be gradually reduced" --

Column 3, line 51 "is connected in electrode 26" -- should read "is connected in circuit between the positive cell electrode 22 and the reference electrode 26" --

Column 4, line 13 "1N4004 2N2222A" -- should read "1N4004 device, and a general purpose transistor 23, such the 2N2222A" --

Column 4, line 36 "in" -- (third word from right margin) should read "within"

Column 5, lines 2 and 3, "embodiments are invention" -- should read "embodiments are likewise to be considered within the scope of the invention" --

Signed and Sealed this

Seventeenth Day of March, 1992

Attest:

HARRY F. MANBECK, JR.

*Attesting Officer*  *Commissioner of Patents and Trademarks*